(12) United States Patent
Sato et al.

(10) Patent No.: US 7,524,894 B2
(45) Date of Patent: Apr. 28, 2009

(54) RESIN COMPOSITION FOR WIRE AND CABLE COVERING MATERIAL

(75) Inventors: Sho Sato, Utsunomiya (JP); Hiroshi Kubo, Moka (JP)

(73) Assignee: Sabic Innovative Plastics IP B.V. (NL)

( * ) Notice: Subject to any disclaimer, the term of this patent is extended or adjusted under 35 U.S.C. 154(b) by 185 days.

(21) Appl. No.: 10/714,428

(22) Filed: Nov. 13, 2003

(65) Prior Publication Data

US 2004/0102551 A1   May 27, 2004

(30) Foreign Application Priority Data

Nov. 14, 2002   (JP)   ............................... P02678-010

(51) Int. Cl.
  *C08L 71/12*   (2006.01)
  *C08L 25/06*   (2006.01)
  *C08K 5/00*   (2006.01)

(52) U.S. Cl. ...................... 524/127; 524/145; 524/370; 524/525; 524/528; 524/540

(58) Field of Classification Search ................ 524/127, 524/145, 370, 525, 528, 540
See application file for complete search history.

(56) References Cited

U.S. PATENT DOCUMENTS

| | | | |
|---|---|---|---|
| 3,361,851 A | 1/1968 | Gowan | |
| 3,383,435 A | 5/1968 | Cizek | 260/874 |
| 3,720,643 A * | 3/1973 | Abu-Isa et al. | 524/409 |
| 4,145,377 A | 3/1979 | Bussink et al. | |
| 4,239,673 A | 12/1980 | Lee, Jr. | |
| 4,421,883 A | 12/1983 | Cooper et al. | |
| 4,584,334 A * | 4/1986 | Lee et al. | 524/151 |
| 4,684,682 A | 8/1987 | Lee, Jr. | |
| 4,879,330 A | 11/1989 | De Munck et al. | |
| 4,988,565 A | 1/1991 | De Munck et al. | |
| 5,034,441 A | 7/1991 | Nakano et al. | |
| 5,109,068 A * | 4/1992 | Yamasaki et al. | 525/151 |
| 5,166,264 A | 11/1992 | Lee, Jr. et al. | |
| 5,206,276 A | 4/1993 | Lee, Jr. | |
| 5,294,655 A | 3/1994 | Lee, Jr. et al. | |
| 5,309,539 A * | 5/1994 | Sano et al. | 385/106 |
| 5,364,898 A | 11/1994 | Lee, Jr. et al. | |
| 5,391,611 A | 2/1995 | Funayama et al. | |
| 5,397,822 A | 3/1995 | Lee, Jr. | |
| 5,455,292 A | 10/1995 | Kakegawa et al. | |
| 5,594,054 A | 1/1997 | Lee, Jr. | |
| 5,777,021 A | 7/1998 | Nakano | |
| 5,777,028 A * | 7/1998 | Okada et al. | 525/86 |
| 5,952,431 A | 9/1999 | Okada | |
| 6,348,540 B1 * | 2/2002 | Sugioka et al. | 524/577 |
| 2002/0137840 A1 | 9/2002 | Adeyinka et al. | |
| 2003/0022968 A1 | 1/2003 | Imanishi | |
| 2003/0164483 A1 | 9/2003 | Scelza et al. | |
| 2004/0039128 A1 | 2/2004 | Sasagawa et al. | |

FOREIGN PATENT DOCUMENTS

| | | |
|---|---|---|
| EP | 0210615 | 2/1987 |
| EP | 0318793 | 6/1989 |
| EP | 0 661 802 B1 | 8/1989 |
| EP | 0356857 | 3/1990 |
| EP | 0422495 | 4/1991 |
| EP | 0467113 | 1/1992 |
| EP | 509506 A2 * | 10/1992 |
| EP | 0546497 | 6/1993 |
| EP | 0587098 | 3/1994 |
| EP | 0587100 | 3/1994 |
| EP | 0639620 | 2/1995 |
| EP | 0892979 | 1/1999 |
| EP | 0985706 | 3/2000 |
| EP | 1045003 A1 * | 10/2000 |
| GB | 2043083 | 10/1980 |
| JP | 07053876 A * | 2/1995 |
| JP | 07331057 A * | 12/1995 |
| WO | WO 97/32928 | 9/1997 |
| WO | WO 99/28388 | 6/1999 |
| WO | WO 02/068532 A1 | 9/2002 |

OTHER PUBLICATIONS

JP. 09052959. Molding for Impact-Resistant Styrene-Based Resin Molded Product. Publication Date Aug. 11, 1995. (Abstract Only).
JP09052958. Molding for Resin Molded Product. Publication Date. Aug. 10, 1995. (Abstract Only).
JP08311196. Production of Acid-Modified Polyphenylene Ether and Polystyrene Resin Composition. Publication Date May 16, 1995. (Abstract Only).
JP08143699. Production of Microporous Membrane. Publication Date Nov. 24, 1994. (Abstract Only).
JP02092948. Flame-Retardant Resin Composition. Publication date Sep. 30, 1988. (Abstract Only).
JP09052959. Molding for Impact-Resistant Styrene-Based Resin Molded Prodcut. Publication Date Aug. 11, 1995. (Abstract Only).
JP09052958. Molding for Resin Molded Prodcut. Publication Date Aug. 10, 1995. (Abstract Only).
JP2064140. Styrene-Based Resin Composition. Publication Date Mar. 5, 1990. (Abstract Only).
JP62104818. Styrene Polymer. Publication Date. May 15, 1987. (Abstract Only).
JP02218724. Draw Molded Body of Styrene-Based Resin and Production Thereof. Publication Date. Sep. 30, 1988 (Abstract Only(.
JP03126743. Styrene-Based Resin Composition. Publication Date. Oct. 13, 1989. (Abstract Only).
JP05086296. Thermoplastic Resin Containing Coated Additive. Publication Date. Feb. 18, 1992. (Abstract Only).

(Continued)

*Primary Examiner*—Kelechi C Egwim
(74) *Attorney, Agent, or Firm*—Cantor Colburn LLP

(57) ABSTRACT

A flexible resin composition comprises poly(arylene ether) resin, syndiotactic polystyrene, olefin elastomer, hydrogenated styrene-butadiene copolymer, and a non-halogen fire retardant.

22 Claims, No Drawings

OTHER PUBLICATIONS

JP052090998. Thermoplastic Resin Composition. Publication Date. Jan. 30, 1992. (Abstract Only).

JP07053815. Impact-Resistant Polystyrene-Based Resin Composition. Publication Date. Aug. 17, 1993 (Abstract Only).

JP06093153. Polystyrene Resin Composition. Publication Date. Sep. 10, 1992 (Abstract Only).

JP06093151. Polyester Resin Composition. Publication Date Sep. 10, 1992 (Abstract Only).

JP05279530. Styrenic Resin Compositin and Reflector of Lighting Apparatus. Publication Date. Mar. 31, 1992. (Abstract Only).

JP07138433. Polystyrenic Resin Composition. Publication Date. Nov. 18, 1993. (Abstract Only).

JP07062175. Thermoplastic Resin Composition. Publication Date. Aug. 31, 1993. (Abstract Only).

JP07331003. Low Dielectric Resin Composition. Publication Date. Jun. 9, 1994 (Abstract Only).

JP02064140. Styrene-Based Resin Composition. Aug. 31, 1988. (Abstract only).

Japanese Patent Publication No. 2001-329162, Published Nov. 27, 2001, Human Translation, 7 pages.

Japanese Patent Application No. H9-87483, Published Mar. 31, 1997, Human Translation, 12 pages.

Japanese Patent Publication No. 2001-310995, Published Nov. 6, 2001, Human Translation, 7 pages.

Japanese Patent Publication No. 1995-292184, Published Nov. 7, 1995, Human Translation, 17 pages.

Japanese Patent Publication No. S63-268709, Published Nov. 7, 1988, Human Translation, 5 pages.

\* cited by examiner

RESIN COMPOSITION FOR WIRE AND CABLE COVERING MATERIAL

BACKGROUND OF INVENTION

The disclosure relates to a resin composition comprising poly(arylene ether). More particularly, it relates to a resin composition that is suitable for wire and cable covering material as it excels in fire retardancy without the use of halogenated compounds and chemical resistance.

Generally, amorphous resins excel in dimensional precision at the time of injection molding because of amorphous structural characteristics, and taking advantage of this characteristic, it is widely used in for molding large objects because assembly with precision is required. However, amorphous resins generally have weak chemical resistance and are easily attacked by oil, organic solvent and like.

On the other hand, crystalline resins have outstanding chemical resistance and are used in applications where the article is exposed to oil, or organic solvent etc. Generally crystalline resins are not suitable for molding large size objects because of the low dimensional precision due to molding shrinkage phenomenon associated with crystallization. Although inorganic fillers, such as glass fiber, can be added to improve molding, these composite materials may exhibit defects like warpage or deformation due to variations in shrinkage.

Poly(arylene ether) resin is an amorphous thermoplastic resin with well balanced mechanical properties, outstanding electrical properties, low water-absorbing property and excellent dimensional resistance. Moreover, poly(arylene ether) resin is compatible with polystyrene resin, which is also a non-crystalline thermoplastic resin, and can be modified easily. Resin compositions comprising poly(arylene ether) resin and polystyrene resin typically have outstanding molding processing characteristics and impact resistance, and are widely used for automobile parts, electrical and electronic components. However, as mentioned above, poly(arylene ether)/ polystyrene resin compositions are amorphous and have moderate chemical resistance at best, especially resistance to aromatic hydrocarbon solvents, e.g. if solvent is exposed to a part which is distorted or a part with residual strain, a glaze or crack may occur and may lead to the rupturing of the part or its components. Therefore, it is generally believed that poly(arylene ether)/ polystyrene resin compositions are unsuitable for applications with a possibility of exposure to lubricating oil, grease, cleaner, cooking oil, oily smoke, organic gas, and the like.

Although various experiments have been performed with poly(arylene ether)/polystyrene resin compositions in order to improve chemical resistance without negatively affecting the desirable characteristics of the composition, the technology to improve the chemical resistance has not been obtained. For example, it has been proposed to blend poly(arylene ether)/polystyrene resin compositions with a crystalline resin, such as polyolefin (e.g. polyethylene, polypropylene, EEA), polyester, nylon etc.; low molecular weight olefin series (e.g. polybutene, ethylene oligomer etc.); and rubber type polymer (e.g. SEBS, SBS, SEPS rubber etc.). However, in this technology, addition of a small amount provides a small improvement in chemical resistance, and the addition of larger amounts to a demonstrate a practical level of chemical resistance affects the mechanical strength, dimensional stability, fire retardancy, and/or causes delamination of the molded part.

Moreover, PVC resin is the conventionally used resin composition for wire and cable covering material. However PVC resin has low heat resistance temperature (60° C.), and contains halogen. Halogen containing resin compositions are increasingly undesirable.

Accordingly, there is a need for a resin composition for wire and cable covering material, which is excellent in fire retardancy (without the use of halogens), excels in chemical resistance, and has excellent compatibility, processability, heat resistance, impact resistance and flexibility.

BRIEF DESCRIPTION OF THE INVENTION

The above mentioned problem may be addressed by a flexible resin composition comprising poly(arylene ether) resin, syndiotactic polystyrene, olefin elastomer, hydrogenated styrene-butadiene copolymer, and a non-halogen fire retardant.

DETAILED DESCRIPTION

The flexible resin composition comprises poly(arylene ether) resin, syndiotactic polystyrene, olefin elastomer, hydrogenated styrene-butadiene copolymer, and a non-halogen fire retardant. The composition excels in fire retardancy and chemical resistance, particularly in bent or distorted areas, and has outstanding processability, heat resistance, impact resistance and flexibility, making it highly useful in wire and cable covering applications. The poly(arylene ether) resin preferably comprises a poly(2,6-dimethyl-1,4-phenylene)ether having intrinsic viscosity in the range of 0.08 to 0.60 dl/g when measured in chloroform at 25° C. The olefin elastomer preferably comprises an ethylene-octene elastomer. The non-halogen fire retardant preferably comprises an aromatic phosphate ester.

In one embodiment, the resin composition comprises 5 to 60 parts by weight poly(arylene ether), 0 to 50 parts by weight syndiotactic polystyrene, 5 to 50 parts by weight olefin elastomer, 3 to 30 parts by weight hydrogenated styrene and butadiene block copolymer having styrene content of at least 40% by weight, and 3 to 30 parts by weight non-halogen fire retardant, based on the combined weight of poly(arylene ether), syndiotactic polystyrene, olefin elastomer, hydrogenated styrene and butadiene block copolymer and non-halogen fire retardant.

Poly(arylene ether)s per se, are known polymers comprising a plurality of structural units of the formula (I):

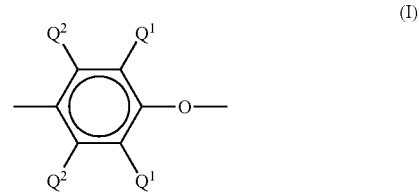

wherein, $Q^1$ and $Q^2$ independently represent hydrogen atom, halogen atom, hydrocarbon group, substituted hydrocarbon group, alkoxy group, cyano group, phenoxy group or nitro group respectively, and the polymer represented by general formula (I) can be used independently or can be used as copolymer formed by combining at least two kinds. Examples of $Q^1$ and $Q^2$ include methyl, ethyl, propyl, aryl, phenyl, benzyl, methylbenzyl, chloromethyl, bromomethyl, cyanoethyl, cyano, methoxy, ethoxy, phenoxy, nitro groups etc. Preferably $Q^1$ are alkyl groups, specifically alkyl group having 1 to 4 carbon atoms, and $Q^2$ are hydrogen atom(s) or alkyl group(s) having 1 to 4 carbon atoms.

Preferred poly(arylene ether) resins include poly (2,6-dimethyl-1,4-phenylene) ether, poly (2,6-diethyl-1,4-phenylene) ether, poly (2-methyl-6-ethyl-1,4-phenylene) ether, poly (2-methyl-6-propyl-1,4-phenylene) ether, poly (2,6-dipropyl-1,4-phenylene) ether, poly (2-ethyl-6-propyl-1,4-phenylene) ether, poly (2,6-dimethoxy-1,4-phenylene) ether, poly (2,6-dichloromethyl-1,4-phenylene) ether, poly (2,6-dibromomethyl-1,4-phenylene) ether, poly (2,6-diphenyl-1,4-phenylene) ether, poly (2,6-ditolyl-1,4-phenylene) ether, poly (2,6-dichloro-1,4-phenylene) ether, poly (2,6-dibenzyl-1,4-phenylene) ether, and poly (2,5-dimethyl-1,4-phenylene) ether etc. Poly (2,6-dimethyl-1,4-phenylene) ether is preferred.

Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer.

Moreover, a modifier that has polar group can modify the poly(arylene ether) resin. Exemplary polar groups include acidic hydride, carbonyl, acid anhydride, acid amide, carboxylate ester, azide, sulfonate, nitrile, cyano, isocyanate ester, amino, imide, hydroxyl, epoxy, oxazoline, and thiol.

The poly(arylene ether) resin preferably has an intrinsic viscosity of 0.08 to 0.60 dl/g (measured at 25° C. using chloroform as a solvent). Preferably the poly(arylene ether) resin is poly (2,6-dimethyl-1,4-phenylene) ether with an intrinsic viscosity of 0.12 to 0.51 dl/g (measured at 25° C. using chloroform as a solvent).

The poly(arylene ether) resin is present in an amount of about 5 to about 60 parts by weight, preferably about 10 to about 50 parts by weight based on 100 parts by weight of the resin composition.

Syndiotactic polystyrene is polystyrene with a highly regular stereochemical structure, that is to say, a highly syndiotactic configuration. In other words, the phenyl groups and substituted phenyl groups of the side groups are alternately located at opposite positions with respect to the main polymer chain. The tacticity in the stereochemical structure may be quantitatively determined by measurement of the nuclear magnetic resonance (NMR) using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. A syndiotactic polystyrene is herein defined as a polystyrene, poly(alkylstyrene), poly(halogenated styrene), poly(halogenated alkylstyrene), poly(alkoxystyrene), poly (vinylbenzoic acid ester), hydrogenated derivative of these polymers, mixtures comprising one of the foregoing polymers, or a copolymer containing constituting units of these polymers as the main components, which generally has the syndiotacticity of 75% or more, preferably 85% or more, expressed in terms of the content of the racemic diad, or 30% or more, preferably 50% or more, expressed in terms of the content of the racemic pentad.

Examples of poly(alkylstyrene) include, but are not limited to, poly(methylstyrene), poly(ethylstyrene), poly(isopropylstyrene), poly(tertiary-butylstyrene), poly(phenylstyrene), poly(vinylnaphthalene), and poly(vinylstyrene). Examples of the poly(halogenated styrene) include poly(chlorostyrene), poly(bromostyrene), and poly(fluorostyrene). Examples of the poly-(halogenated alkylstyrene) include poly(chloromethylstyrene). Examples of the poly(alkoxystyrene) include poly(methoxystyrene) and poly(ethoxystyrene).

Particularly preferable examples of syndiotactic polystyrene include polystyrene, poly(p-methylstyrene), poly(m-methylstyrene), poly(p-tertiary-butylstyrene), poly(p-chlorostyrene), poly(m-chlorostyrene), poly(p-fluorostyrene), hydrogenated polystyrene, copolymers containing comprising units of the above polymers and combinations comprising one of the foregoing syndiotactic polystyrenes.

The molecular weight of the styrenic polymer is not particularly limited. The weight-average molecular weight is preferably greater than or equal to about 10,000 atomic mass units (AMU), and preferably greater than or equal to about 50,000, as determined by gel permeation chromatography. The molecular weight distribution is not particularly limited, and syndiotactic polystyrene having various molecular weight distributions can be used. The melting point of the syndiotactic polystyrene is about 200 to about 310° C.

Syndiotactic polystyrene can be produced by polymerizing a styrenic monomer (a monomer corresponding to the repeating unit in syndiotactic polystyrene) in an inert hydrocarbon solvent or in the absence of solvents by using a titanium compound and a condensation product of water and trialkylaluminum as the catalyst.

The above mentioned syndiotactic styrene polymer can be modified by modifier, which has polar group. As polar group, such as acidic hydride, carbonyl group, acid anhydride, acid amide, carboxylate ester, azide, sulfon group, nitrile group, cyano group, isocyanate ester, amino group, imide group, hydroxyl group, epoxy group, oxazoline group, thiol group etc., are included. Specifically, acid anhydride and epoxy groups are preferred as polar groups and amongst the acid anhydride, maleic anhydride is preferred.

The syndiotactic polystyrene is present in an amount of 0 to about 50 parts by weight, preferably 5 to about 35 parts by weight, and more preferably about 10 to about 30 parts by weight, based on 100 parts by weight of the resin composition.

Suitable olefin elastomers are obtained by random copolymerization of ethylene and one or more alpha-olefins having 3 to 12 carbon atoms. Exemplary alpha-olefins include propylene, 1-butene, 1-hexene, 1-heptene, 1-decene, 1-dodecene, etc. They can be used independently or in combination.

The olefin elastomer can be prepared by methods such as high-pressure ion-catalyzed polymerization, vapor phase polymerization, and solution polymerization using well-known titanium catalyst or metallocene catalyst.

The olefin elastomer is present in amounts of about 5 to about 50 parts by weight, preferably about 10 to about 40 parts by weight, based on 100 parts by weight resin composition.

Hydrogenated styrene-butadiene block copolymer preferably has a styrene content greater than or equal to about 40% by weight, more preferably greater than or equal to about 50% by weight, based on the total weight of the hydrogenated styrene-butadiene block copolymer.

The hydrogenated styrene-butadiene block copolymer is obtained by the hydrogenation of a block copolymer comprising polymer block A comprising styrene, and polymer block B comprising butadiene. For example, hydrogenated styrene-butadiene block copolymer may have a structure such as A-B, A-B-A, B-A-B-A, A-B-A-B-A, B-A-B-A-B, and the like.

The distribution of monomers in the polymer blocks may be random, tapered (monomer components are increased or decreased as per the molecular chain), partial block type or a combination of two or more of the foregoing. When polymer block A comprising styrene, and polymer block B comprising hydrogenated butadiene comprise at least two blocks, each polymer block can either have the same structure, or different.

Moreover, there is no particular limitation on the mode of incorporation of the butadiene in the polymer block comprising butadiene. For example, when the conjugated diene is 1,3-butadiene preferably 1,2-incorporation is about 20 to about 50%, more preferably about 25 to about 45%.

The number average molecular weight of the hydrogenated styrene-butadiene block copolymer is about 5,000 to 1,000,000 AMU, preferably about 10,000 to about 800,000 AMU, and most preferred is about 30,000 to about 500,000 AMU. The molecular weight distribution (ratio of weight average molecular weight (Mw) and number average molecular weight (Mn) (Mw/Mn)) is at least about 10. In addition, the molecular structure of hydrogenated block copolymer may be straight chain, branched chain, radial, or their combination.

The block copolymer comprising above-mentioned structure can be prepared by any of the method. According to preparation method mentioned in Kokai No. 40-23798, styrene-butadiene block copolymer may be synthesized in an inert solvent using lithium catalyst, and the hydrogenation of the styrene-butadiene block copolymer can be carried out by any method mentioned in Kokai No. 42-8704 and Kokai No. 43-6636. Specifically, the hydrogenated block copolymer prepared using a titanium hydrogenated catalyst has outstanding weather resistance and heat-resistance and thus is preferred. A hydrogenated block copolymer can be synthesized by the method mentioned in Kokai No. 59-133203 and Kokai No. 60-79005 where hydrogenation is carried out in an inert solvent in the presence of a titanium hydrogenated catalyst.

Preferably at least 80% of the double bonds of butadiene are hydrogenated, based on the total amount of butadiene in the block copolymer, and the butadiene containing blocks are morphologically converted to olefin compound containing blocks. There is no restriction with regard to the amount of hydrogenation of the aromatic double bonds present in the copolymer, but an aromatic hydrogenation less than 20% is preferred. The amount of unhydrogenated aliphatic double bond contained in the hydrogenated block copolymer can be easily determined by infrared photometer, nuclear magnetic resonance apparatus etc.

The hydrogenated styrene-butadiene block copolymer is present in an amount of about 3 to about 30 parts by weight, preferably about 5 to about 20 parts by weight with respect to 100 parts by weight resin composition.

Although various fire retardants other than a halogen fire retardant can be used as a non-halogen fire retardant, phosphate ester fire retardants are preferred. Exemplary phosphate ester fire retardants include trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, dimethyl ethyl phosphate, methyl dibutyl phosphate, ethyl dipropyl phosphate, hydroxyphenyl diphenyl phosphate and combinations of two or more of the foregoing.

Phosphate ester fire retardants also include aromatic polyphosphate esters. Useful polyphosphate esters include those that can be represented by the following general formula:

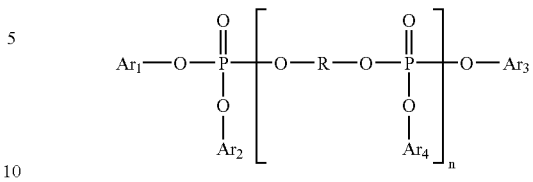

where R has one of the following structures:

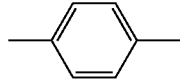
(A1)

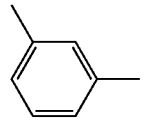
(A2)

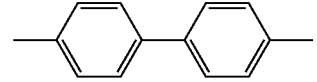
(A3)

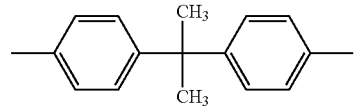
(A4)

and n varies from 1 to 10, $Ar_1$ to $Ar_4$ are a phenyl group, tolyl group or xylyl group. Further, when n is at least 2, each $Ar_4$ may be same or differ. Preferably R is A4. The polyphosphate esters can be used independently or at least two types can also be used together. Preferred phosphate ester fire retardant are aromatic phosphate esters.

It is desirable that the non-halogen fire retardant is present in an amount of about 3 to about 30 parts by weight, preferably about 5 to about 25 parts by weight based on 100 parts by weight of the resin composition.

The flexible resin composition may further comprise one or more additive agents, such as pigments, dyes, fire retardancy supporter, stiffener (e.g. glass fibre, carbon fibre, whisker etc.), filler (carbon black, silica, titanium oxide, mica, talc, calcium carbonate, potassium titanate, wollastonite etc.), antioxidant, ultraviolet absorbent, light stabilizer, lubricant, mold lubricant, nucleating agents, plasticizer (oil, low molecular weight polyethylene, epoxidized soybean oil, polyethylene glycol, fatty acid ester, etc.), fluidity improving agent, antistatic agent, compatibilizer (dicarboxylic acid and anhydrate, such as maleic anhydride, citric acid), antibacterial agent etc., can be added during blending or molding of the resin composition within the limits which do not have any adverse effect on the invention.

The light stabilizer or ultraviolet absorbent, such as hindered amine compound, benzoate compound, benzotriazole compound, benzophenone or formamidine etc. are effective in granting and improving the weather resistance. Furthermore, nucleating agents, such as inorganic talc, metallic salts of aromatic carboxylic acid, organic nucleating agents, such as sorbitol or metallic salts of aromatic phosphoric acid are effective in granting and improving the rigidity and brittleness.

There is no restriction for the preparation method of the flexible resin composition. Conventional methods can be used satisfactorily, and the common method-fusion and kneading method is preferred. Although use of small amount of solvent is also possible, generally it is unnecessary. As fusion and kneading apparatus, monoaxial extruder, biaxial extruder, banbury mixer, roller mixer, kneader, brabender plastograph etc., are listed, but biaxial extruder is preferred for fusion and kneading method. The fusion and kneading temperature is not limited, but the common range is 150 to 350.

Thus, after insulating the electrical conductor, such as copper wire, using the obtained resin composition, and wires and cables are manufactured by extrusion.

The invention is further described by the following non-limiting examples.

EXAMPLES

The following examples were prepared using the material listed in Table 1.

revolution speed 280 rotation per minute (rpm). Test pieces were prepared using by injection molding with a melt temperature of 280° C. and a tool temperature of 60° C.

Electric wire of outer diameter 0.94 millimeters (mm) was made by coextrusion using the above described compositions at a temperature of 280° C. with linear velocity 130 to 260 meters per hour (m/hour). The following evaluations were performed for the obtained test piece and electric wire. The results are shown in Table 2. The measuring methods used for evaluation are as follows. Notched Izod impact strength (Izod impact strength) measured in accordance with ASTM D256 at 230° C. Tensile strength was measured in accordance with ASTM D638. Tensile elongation was measured in accordance with ASTM D638. Flexural intensity was measured in accordance with ASTM D790. Flexural modulus was measured in accordance with ASTM D790. Heat distortion temperature (HDT) was measured in accordance with ASTM

TABLE 1

| Component | Description |
|---|---|
| PPE | Poly(2,6-dimethyl-1,4-phenylene)ether with an intrinsic viscosity of 0.46 dl/g as measured in chloroform at 30° C. (brand name: PPO646, manufactured by Japan GE Plastic Ltd.. |
| GPPS | Atactic styrene polymer (brand name: CR-3500, manufactured by Dainippon Ink And Chemicals Ltd.) |
| s-PS | Syndiotactic polystyrene having syndiotacticity represented by racemic pentad of 98% per $^{13}$C NMR analysis (brand name: Zarrek130ZC, manufactured by Idemitsu Petrochemicals Ltd.). |
| EOR | Ethylene-octene elastomer (brand name: EXACT8201, Exxon Mobil Chemical Co. Ltd. Product |
| High styrene SEBS | Hydrogenated styrene-butadiene block copolymer having styrene content of at least 67% by weight (brand name: Tuftec H1043, Asahi Chemicals Co. Ltd. product) |
| High molecular weight SEBS | Hydrogenated styrene-butadiene block copolymer having styrene content of 33% by weight, (brand name: Clayton G1651, Clayton polymer Co. Ltd. product) |
| Low molecular weight SEBS | Hydrogenated styrene-butadiene block copolymer having styrene content of 29% by weight, (brand name: Clayton G1650, Clayton polymer Co. Ltd. product) |
| Fire retardant | Compound represented by the following formula, 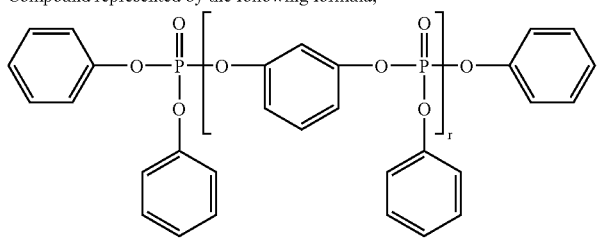 and mixtures wherein r = 1 to 10 (brand name: CR733S, manufactured by Daihachi-chemicals co. ltd.) |
| Liquid petroleum | Liquid petroleum (brand name: Flexon845, manufactured by Esso Sekiyu Co. Ltd.), |
| Phosphorous stabilizer | Phosphorous stabilizer (brand name: Mark 2113, manufactured by Asahi Denka Kogyo Co. Ltd.), |
| HP system antioxidant | Hindered phenol stabilizer system antioxidant: (brand name: Mark A050, manufactured by Asahi Denka Kogyo Co. Ltd.) |
| ZnS | Zinc sulfide, brand name: SACHTOLITH HD, manufactured by Sachtleben co. ltd. |
| MgO | Magnesium oxide, brand name: Kyowa Mag 150, Kyowa chemical industry co. ltd. |

Examples 1 to 2 and Comparative Examples 1 to 3

The pellets were manufactured by melting and kneading the components in the amounts as shown in Table 2 by using 30 mm biaxial extruder at kneading temperature 280° C. and D648. Melt Flow Index (MFI) was measured in accordance with ASTM D1238 at 250° C., load 10 kg. Specific gravity was measured in accordance with ASTM D792. Chemical resistance test: Strand of 1 mm diameter was prepared by melting the obtained pellets at 280° C. The strands were cut into sections having a weight of approximately 1 gram and immersed in gasoline (regular gasoline, Idemitsu Kosan Co. Ltd.). The pieces were removed from gasoline after 20 hours, and dried at room temperature for 24 hours. Further it was dried for 24 hours at 80° C. The weight retention was determined after and before gasoline immersion test.

TABLE 2

| Resin Composition (parts by weight) | Ex. 1 | Ex. 2 | Comp. Ex. 1 | Comp. Ex. 2 | Comp. Ex. 3 |
|---|---|---|---|---|---|
| PPE | 29 | 22 | 29 | 29 | 29 |
| GPPS | — | — | 29 | 29 | — |
| s-PS | 29 | 20 | — | — | 29 |
| EOR | 25 | 33 | — | — | — |
| High styrene SEBS | 6 | 8 | — | — | — |
| High molecular weight SEBS | — | — | 31 | — | 31 |
| Low molecular weight SEBS | — | — | — | 31 | — |
| Fire retardant | 11 | 17 | 11 | 11 | 11 |
| Liquid petroleum | 3 | 3 | 3 | 3 | 3 |
| Phosphate stabilizer | 0.5 | 0.5 | 0.5 | 0.5 | 0.5 |
| HP system antioxidant | 0.5 | 0.5 | 0.5 | 0.5 | 0.5 |
| ZnS | 0.1 | 0.1 | 0.1 | 0.1 | 0.1 |
| MgO | 0.1 | 0.1 | 0.1 | 0.1 | 0.1 |

| Evaluation parameter | Unit | Result | | | |
|---|---|---|---|---|---|
| Izod impact strength | J/m | 434 | 702 | 672 | 833 | 718 |
| Tensile strength | Mpa | 32 | 19 | 23 | 27 | 26 |
| Tensile elongation | % | 76 | 147 | 72 | 21 | 86 |
| Flexural intensity | MPa | 56 | 32 | 28 | 43 | 41 |
| Flexural modulus | MPa | 1938 | 1159 | 1295 | 1302 | 1424 |
| HDT | 0C | 83.6 | 65.2 | 87.2 | 87.6 | 85.8 |
| MFI | g/10 min | 26 | 116 | 47 | 22 | 14 |
| Specific gravity | — | 1.03 | 1.03 | 10.3 | 1.04 | 1.04 |
| Chemical resistance test | % | 89 | 77 | 65 | 66 | 71 |

Examples 3 and 4

Electric wires were prepared using the resin composition of Examples 1 and 2. The electric wire had an outer diameter of 0.94 mm and an inner diameter of 0.54 mm. The extrusion kneader temperature was 280° C. The linear velocity was 108 to 160 meters per minute (m/min). The following evaluations were carried out regarding the obtained electric wire and the results are shown in Table 3. Fire retardancy was measured in accordance with ISO6722. Chemical resistance was measured in accordance with ISO6722 and the chemical used was gasoline (Idemitsu Kosan Co. Ltd. Product).

TABLE 3

| Resin Composition (parts by weight) | Example 3 | Example 4 |
|---|---|---|
| PPE | 29 | 22 |
| GPPS | — | — |
| s-PS | 29 | 20 |
| EOR | 25 | 33 |

TABLE 3-continued

| High styrene SEBS | 6 | 8 |
|---|---|---|
| High molecular weight SEBS | — | — |
| Low molecular weight SEBS | — | — |
| Fire retardant | 11 | 17 |
| Liquid petroleum | 3 | 3 |
| Phosphate stabilizer | 0.5 | 0.5 |
| HP system antioxidant | 0.5 | 0.5 |
| ZnS | 0.1 | 0.1 |
| MgO | 0.1 | 0.1 |

| Evaluation parameter | Evaluation method | Characteristics Evaluation result | |
|---|---|---|---|
| Fire retardancy | ISO6722 | Pass | Pass |
| Chemical resistance test | ISO6722 | Pass | Pass |

While preferred embodiments have been shown and described, various modifications and substitutions may be made thereto without departing from the spirit and scope of the invention. Accordingly, it is to be understood that the present invention has been described by way of illustration and not limitations.

The invention claimed is:

1. A flexible resin composition consisting of poly(arylene ether) resin, syndiotactic polystyrene, ethylene-octene elastomer, hydrogenated styrene-butadiene block copolymer, a phosphate ester fire retardant, and one or more additives selected from the group consisting of pigments, dyes, antioxidants, ultraviolet absorbents, light stabilizers, lubricants, mold lubricants, nucleating agents, plasticizers, fluidity improving agents, antistatic agents, compatibilizers, antibacterial agents, wherein the poly(arylene ether) is present in an amount of 10 to 50 parts by weight, based on 100 parts by weight of the combined weight of poly(arylene ether), syndiotactic polystyrene, ethylene-octene elastomer, hydrogenated styrene-butadiene and phosphate ester fire retardant.

2. The composition of claim 1, wherein the poly(arylene ether) has an intrinsic viscosity of 0.08 to 0.60 dl/g, measured at 25° C. in chloroform.

3. The composition of claim 1, wherein the poly(arylene ether) is poly (2,6-dimethyl-1,4-phenylene) ether.

4. The composition of claim 1, wherein the poly(arylene ether) is modified with a modifier having a polar group.

5. The composition of claim 1, wherein the syndiotactic polystyrene has a syndiotacticity of 30% or more expressed in terms of the content of the racemic pentad.

6. The composition of claim 1, wherein the syndiotactic polystyrene has a weight average molecular weight greater than or equal to 10,000 atomic mass units as determined by gel permeation chromatography.

7. The composition of claim 1, wherein the syndiotactic polystyrene is modified with a modifier having a polar group.

8. The composition of claim 1, wherein the syndiotactic polystyrene is present in an amount of 5 to 35 parts by weight, based on the combined weight of poly(arylene ether), syndiotactic polystyrene, ethylene-octene elastomer, hydrogenated styrene-butadiene and phosphate ester fire retardant.

9. The composition of claim 1, wherein the ethylene-octene elastomer is present in an amount of 5 to 50 parts by weight, based on the combined weight of poly(arylene ether), syndiotactic polystyrene, ethylene-octene elastomer, hydrogenated styrene-butadiene and phosphate ester fire retardant.

10. The composition of claim 1, wherein the hydrogenated styrene-butadiene block copolymer has a styrene content greater than or equal to 40% by weight, based on the total weight of the hydrogenated styrene-butadiene block copolymer.

11. The composition of claim 10, wherein the hydrogenated styrene-butadiene block copolymer has a styrene content greater than or equal to 50% by weight, based on the total weight of the hydrogenated styrene-butadiene block copolymer.

12. The composition of claim 10, wherein the hydrogenated styrene-butadiene block copolymer has a number average molecular weight of 5,000 to 1,000,000 atomic mass units.

13. The composition of claim 1, wherein the hydrogenated styrene-butadiene block copolymer has at least 80% of the double bonds of butadiene hydrogenated.

14. The composition of claim 1, wherein the hydrogenated styrene-butadiene block copolymer is present in an amount of 3 to 30 parts by weight, based on the combined weight of poly(arylene ether), syndiotactic polystyrene, ethylene-octene copolymer elastomer, hydrogenated styrene-butadiene and phosphate ester fire retardant.

15. The composition of claim 1, wherein the phosphate ester fire retardant is selected from the group consisting of trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, dimethyl ethyl phosphate, methyl dibutyl phosphate, ethyl dipropyl phosphate, hydroxyphenyl diphenyl phosphate, and combinations of two or more of the foregoing.

16. The composition of claim 1, wherein the phosphate ester fire retardant is an aromatic polyphosphate ester.

17. The composition of claim 1, wherein the phosphate ester fire retardant is a polyphosphate ester represented by the following formula:

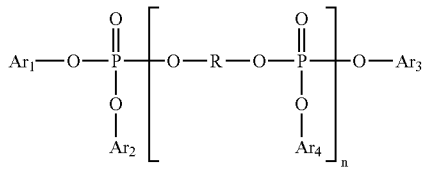

where R has one of the following structures:

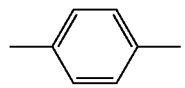 (A1)

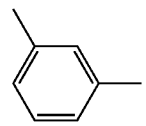 (A2)

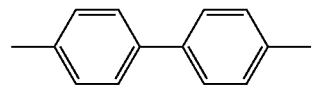 (A3)

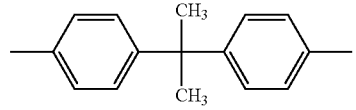 (A4)

n varies from 1 to 10, and $Ar_1$ to $Ar_4$ are a phenyl group, tolyl group or xylyl group.

18. The composition of claim 1, wherein the phosphate ester fire retardant is present in an amount of 5 to 25 parts by weight, based on the combined weight of poly(arylene ether), syndiotactic polystyrene, ethylene-octene elastomer, hydrogenated styrene-butadiene and phosphate ester fire retardant.

19. The composition of claim 17, wherein the syndiotactic polystyrene is present in an amount of 5 to 35 parts by weight, based on the combined weight of poly(arylene ether), syndiotactic polystyrene, ethylene-octene elastomer, hydrogenated styrene-butadiene and phosphate ester fire retardant.

20. An electric wire comprising the composition of claim 1.

21. A flexible resin composition consisting of poly(arylene ether) resin, syndiotactic polystyrene, ethylene-octene elastomer, hydrogenated styrene-butadiene block copolymer, a phosphate ester fire retardant, and one or more additives selected from the group consisting of pigments, dyes, antioxidants, ultraviolet absorbents, light stabilizers, lubricants, mold lubricants, nucleating agents, plasticizers, fluidity improving agents, antistatic agents, compatibilizers, antibacterial agents wherein the poly(arylene ether) is present in an amount of 10 to 50 parts by weight, based on 100 parts by weight of the combined weight of poly(arylene ether), syndiotactic polystyrene, ethylene-octene elastomer, hydrogenated styrene-butadiene and phosphate ester fire retardant and further wherein the hydrogenated styrene-butadiene copolymer has a styrene content greater than or equal to 50% by weight, based on the total weight of the hydrogenated styrene-butadiene block copolymer and the hydrogenated styrene-butadiene block copolymer has at least 80% of the double bonds of butadiene hydrogenated.

22. A flexible resin composition consisting of poly(arylene ether) resin, syndiotactic polystyrene, ethylene-octene elastomer, hydrogenated styrene-butadiene block copolymer, a phosphate ester fire retardant, and one or more additives selected from the group consisting of pigments, dyes, antioxidants, ultraviolet absorbents, light stabilizers, lubricants, mold lubricants, nucleating agents, plasticizers, fluidity improving agents, antistatic agents, compatibilizers, antibacterial agents, wherein the hydrogenated styrene-butadiene copolymer has a styrene content greater than or equal to 50% by weight, based on the total weight of the hydrogenated styrene-butadiene block copolymer.

* * * * *